United States Patent [19]

Taddeo

[11] Patent Number: 5,148,283
[45] Date of Patent: Sep. 15, 1992

[54] METHOD AND APPARATUS FOR DRESSER VIDEO IMAGES

[76] Inventor: Franklin A. Taddeo, 533 Monongahela Ave., Glassport, Pa. 15045

[21] Appl. No.: 501,860

[22] Filed: Mar. 30, 1990

[51] Int. Cl.$^5$ ............................................. H04N 5/64
[52] U.S. Cl. ...................................... 358/254; 358/255
[58] Field of Search ................. 358/254, 255; 312/7.2; D6/315

[56] References Cited

U.S. PATENT DOCUMENTS

| | | | |
|---|---|---|---|
| D. 200,929 | 4/1965 | Janssen | 358/254 |
| D. 208,330 | 8/1967 | Roegner | 358/254 |
| 2,845,618 | 7/1958 | Hijffman | 358/254 |
| 2,912,066 | 11/1959 | Ellithorpe | 358/254 |
| 3,940,136 | 2/1976 | Runte | 358/254 |
| 4,584,603 | 4/1986 | Harrison | 358/254 |

FOREIGN PATENT DOCUMENTS 0028331  3/1978  Japan ..................................... 358/255

Primary Examiner—Edward L. Coles, Sr.
Attorney, Agent, or Firm—Jon M. Lewis

[57] ABSTRACT

A dresser video is disclosed comprising a chest of drawers with a mirror mounted on a frame upstanding from the chest of drawers. The mirror has a semi-transparent portion that allows partial light transmission and partial light reflection from either side of the mirror. A video transmitter is mounted behind the semi-transparent portion of the mirror and has a seal interposed between the video screen and the mirror. Mounting brackets removeably but securely hold the video transmitter on the frame and so that it transmits toward the back side of the mirror. The video screen is dark when not on and therefore the front side of the mirror will seem to be a normal reflecting mirror that is standard fare for dressers. When the video transmitter is turned on and transmitting the florescence of the front of the cathode ray tube will emit light images that will transmit through the semi-transparent mirror so that they can be seen on the front side of the mirror. The lighting on both sides of the mirror may be controlled so as to produce a satisfactory picture that is visible from the front side of the mirror. Remote control operation of the video transmitter is provided along with timer on and off controls for the video transmitter.

15 Claims, 3 Drawing Sheets

METHOD AND APPARATUS FOR DRESSER VIDEO IMAGES

FIELD OF INVENTION

The present invention pertains to an apparatus for viewing a video transmitter through a semi-transparent mirror mounted on a chest of drawers.

BACKGROUND OF THE INVENTION

Semi-transparent mirrors are old in the art as is demonstrated by U.S. Pat. No. 3,310,794 to Lusebrink which discloses a cabinet with a door having a viewing area covered with a semi-transparent reflective material. The object of such a semi-transparent reflective material is that when one side of such material is illuminated one may see the area of illumination and when that one side is not illuminated one may see only a mirror. Methods of producing such materials are illustrated by the U.S. Pat. Nos. 2,779,690; 2,478,816; 2,884,337; and 3,450,465. These references show that one way mirrors as they are called are not new and the production of such material is well known to one of ordinary skill in the art.

Such materials have been known to be used for producing selective viewing from one room to another and for selective viewing in closets and refrigerators as is disclosed in the above mentioned U.S. Pat. No. 3,310,794. Uses of such materials are also known for use with televisions as is illustrated with U.S. Pat. No. 2,492,224 wherein the material is combined with a T.V. cabinet in order to enhance its decorative appearance when the TV is not turned on.

Watching television, video camera recorders or video transmitters is a form of relaxation and is quite usually done as one is ready to retire for the evening. For those that do not have a television or video transmitter in their bedroom the usual result is that they fall asleep on their couch or in their chair, the chair or couch quite often located in a room other than their bedroom. This results in their having to arise at some later time, in a state of drowsiness, and then prepare to retire to their bedroom. For those that do have a television or video transmitter in their bedroom their problems are of a different nature. A television or video transmitter is usually made as decorative as possible, however due to the size of the components it is usually a bulky item. When such an item is placed in a bedroom for viewing it appears out of place. If the video transmitter is of a compact size it is usually placed on an article of furniture already in the bedroom or its own stand must be placed in the bedroom. When placed on an article of furniture already in the bedroom the video transmitter takes up space normally designed for other things and in addition tends to give the room a cluttered look or encourages clutter around its location. When placed on its own stand the video transmitter and stand usually do not enhance the appearance or the decor of the bedroom. Since most articles of bedroom furniture are not designed for placing the video transmitter thereon it is usually difficult to see the screen of the video transmitter from a comfortable position in a bed. Likewise with TV stands, since they are usually designed with the thought in mind that a person will be sitting when viewing such video transmitter.

It is an object of the present invention to provide an already decorative piece of bedroom furniture with a video transmitter screen that will only be visible when operating.

It is an object of the present invention to provide a dresser with a semi-transparent portion on its mirror so that a video transmitter may be seen on the mirror when the transmitter is operating.

It is an object of the present invention to mount a video transmitter on a dresser mirror so that it may easily be seen from a comfortable position on a bed.

It is an object of the present invention to provide a semi-transparent reflective surface on a dresser mirror so that a remote control video transmitter may be placed behind said mirror.

It is an object of the present invention to provide a semi-transparent reflective mirror on a dresser so that the video screen of the transmitter may be seen when operating and the body of the transmitter is hidden behind the mirror of the dresser.

It is an object of the present invention to enhance the decorative appearance of a bedroom having a video screen for viewing.

It is a still further object of the present invention to provide a higher than normal position for a video transmitter when viewing from a bed in a bedroom.

SUMMARY OF INVENTION

According to the present invention a dresser, which is usually comprised of a chest of drawers, a frame attached to the chest of drawers and a mirror mounted on said frame, is provided with a video transmitter mounted behind the mirror on the dresser. The portion of the mirror on the dresser in front of the video screen is comprised of a semi-transparent reflective material so that light is partially transmitted through that portion of the mirror. Mounting means are provided so that the video transmitter can be located on the frame of the dresser preferably placing the screen of the video transmitter more than thirty (30) or thirty-two (32) inches above the bottom of the dresser or more than thirty (30) or thirty-two (32) inches from the floor of the room in which the dresser is located.

The apparatus of the invention is a dresser mirror and video image transmitter in combination which comprises a dresser having a chest of drawers with a frame and a mirror having a back side and a front side mounted on said frame. The mirror is comprised of a semi-transparent portion allowing light to be partially transmitted through said mirror from either side of said mirror. The video image transmitter has means for receiving input video signals and a video screen for transmitting a video images therefrom, and may consist of a television, a VCR, or any other device designed for receiving and transmitting video signals.

There is provided a mounting means connected to said frame for mounting said video image transmitter adjacent to and facing the back side of said semi-transparent portion of said mirror. The video images emitted from the video screen may then be transmitted through said mirror from said back side of said mirror, when the video transmitter is operating.

The invention also contemplates providing means for controlling the amount of light on both sides of said mirror so that when said transmitter is on, the image transmitted may be seen on the semi-transparent portion of the front side of said mirror, and when the transmitter is off, the semi-transparent portion of the front side of said mirror will appear to be a fully reflective mirror. Preferably part of said means for controlling the amount of light on said first and second sides of said mirror comprises a seal interposed between said video image transmitter and said first side of said mirror so that all light emitted from said transmitter is directed through said mirror.

The invention also contemplates utilizing a material for said semi-transparent portion of said mirror which has means thereon for allowing more light to be transmitted from the back side of the mirror through the front side than will be allowed to be transmitted from the front side through the back side of the mirror.

The invention further contemplates utilizing a material for said semi-transparent reflective portion which has means thereon for reflecting more light from the front side of said mirror than is reflected from the back side of said mirror.

To provide a most optimum material the invention further contemplates the utilization of a combination of the above mentioned materials with the back side of the mirror able to transmit more light through the front side than the front side and the front side able to reflect more light than the back side.

To provide the most comfortable viewing the present invention preferably provides mounting means for the video transmitter than holds the video screen more than thirty (30) inches above the bottom of the dresser or the floor of the room in which the dresser is located.

The present invention also contemplates the method of producing a video image transmission from a dresser which comprises the steps of mounting a means for receiving and transmitting video signals from a video transmitter behind a dresser mirror, providing the portion of the mirror on the dresser in front of the video screen of the transmitter with a semi-transparent reflective surface so that light is partially reflected by and partially transmitted through said portion of said mirror. The invention further contemplates the step of reducing the amount of light on one side of said semi-transparent reflective material so that the other side of said semi-transparent reflective material appears as a fully reflective mirror when said video transmitter is not operating. This is preferably accomplished by providing a seal between the video transmitter and the semi-transparent reflective portion of the mirror so that the intensity of the video image emitted to the back side of the portion of the mirror is maximized when the video transmitter is operating. When the video transmitter is not operating the lack of light on the video screen side of the mirror is maximized.

The invention also contemplates the step of mounting the transmitter so that the video screen is more than thirty (30) inches above the bottom of the dresser.

The invention further contemplates the step of allowing more light to be transmitted from the back side of the mirror through the front side than will be allowed to be transmitted from the front side through the back side of the mirror.

The invention further contemplates the step of reflecting more light from the front side of said mirror than is reflected from the back side of said mirror.

Other objects and further scope of applicability of the present invention will become apparent from the detailed description given hereinafter; it should be understood, however, that the detailed description, while indicating preferred embodiments of the invention, is given by way of illustration only, since various changes and modifications within the scope of the invention will become apparent to those skilled in the art from the detailed description which follows.

For a more complete understanding of the invention and the objects and advantages thereof, reference should be had to the accompanying drawing and the following detailed description wherein preferred embodiments of the invention are illustrated and described.

DETAILED DESCRIPTION OF THE PREFERRED EMBODIMENTS

Figure 1:
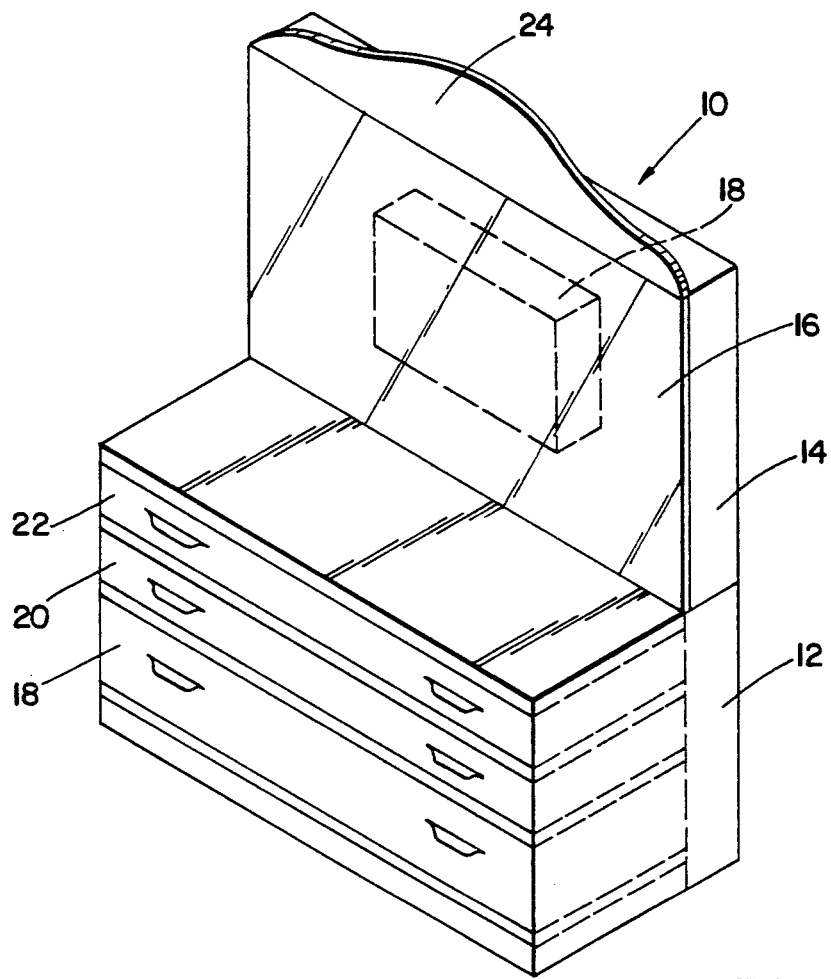
FIG. 1 is a perspective view of a dresser utilized with the present invention.

What is shown in FIG. 1 is a dresser 10 with a dresser frame 12 having an upstanding frame portion 14 holding a mirror 16. The dresser 10 has drawers as is shown at 18, 20, and 22 and may be described as a typical dresser that goes into the bedroom of a typical home. The dresser 10 may have some type of decorative molding 24 extending above the mirror 16. The particular dresser 10 shown in FIG. 1 has the exaggerated frame portion 14, with a support space 16 built in, so as to hold a video transmitter (shown in later figures) according to the present invention.

Figure 2:
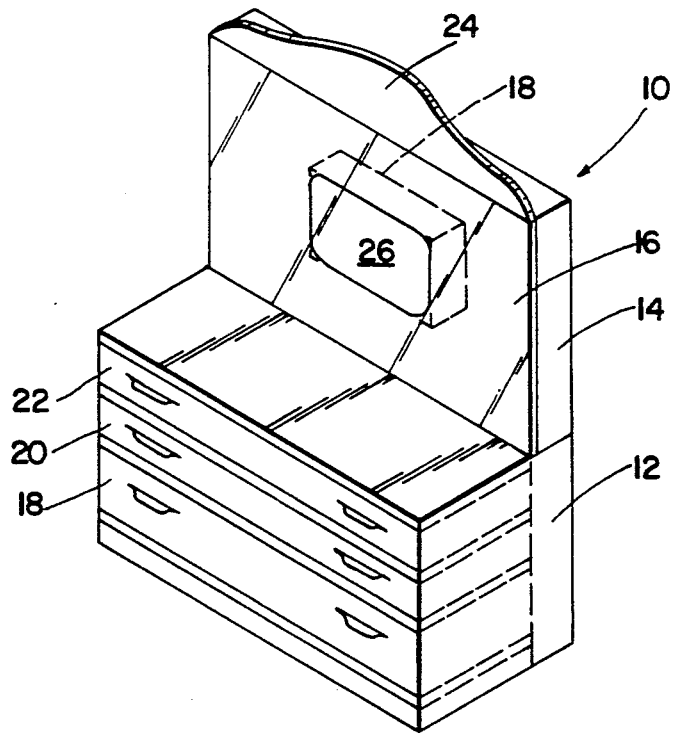
FIG. 2 is a perspective view of the dresser according to the present invention.

Shown in FIG. 2 is the dresser 10, according to the present invention, having the upstanding portion 14 of the frame 12, supporting a mirror 16. The video transmitter is shown forming an image 24 on a portion 26 of the mirror 26.

Figure 3:
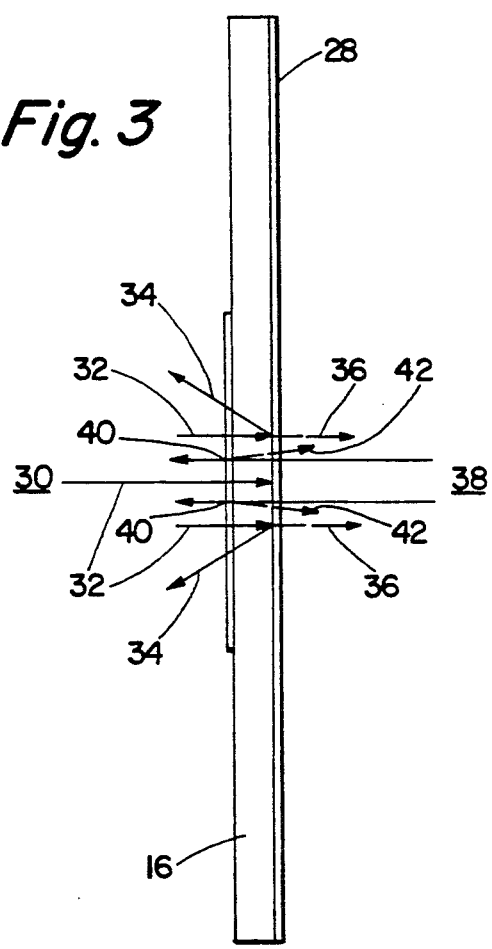
FIG. 3 is a side view of a semi-transparent reflective material according to the present invention.

Shown in FIG. 3 is a side view of the mirror 16 showing the semi-reflective, semi-transparent portion 26 of the mirror 16. The semi-reflective, semi-transparent portion 26 is intended to be placed in front of a video transmitter which will be shown in FIG. 4, so the video image may be transmitted through the mirror or glass 16. On the glass 16 is formed a coating 28 of a partially light reflective, partially light transmitting coating, well known in the trade, so that the video transmitter sitting immediately behind, next, or adjacent to portion 28 will be able to transmit an image through the glass 16 and out to the room, as is indicated at 30. Light rays 32 are shown striking the glass portion 16 with the coating 28, and showing the rays reflected as at 34, and partially transmitted, as at 36. This effect works in the opposite manner also, in that the image rays originating at 38 will be transmitted through the glass, shown at 40, although part of the light rays may be reflected as shown at 42. Shown further in FIG. 4 is again the dresser 10, with the frame 12 having an upstanding portion 14, with a support bracket 50 for supporting a video transmitter 52. The video transmitter 52 is placed immediately behind the semi-reflective, semi-transparent portion shown at 28 on the mirror, so that the video image indicated by rays 54 will be transmitted through the portion 28 or mirror 16. The video transmitter 52 is shown sitting on, and supported by both the upstanding portion 14 of the frame and the bracket member 50. The bracket member 50 has adjustable threaded clamp members 56 that clamp to the frame of the video tube 52 so as to hold the video tube in place. The preferred mode of the invention will use a transparent mirror manufactured by Libbey-Owens-Ford and called Mirropane EP. (Mirropane EP is believed to be a trademark of Libbey-Owens-Ford) When Mirropane EP is used, the coated side of the transparent mirror should be located on the side of the mirror facing the television. The preferred lighting ratio should be 10:1 with the room lighting being the lower value of the ratio.

Figure 4:
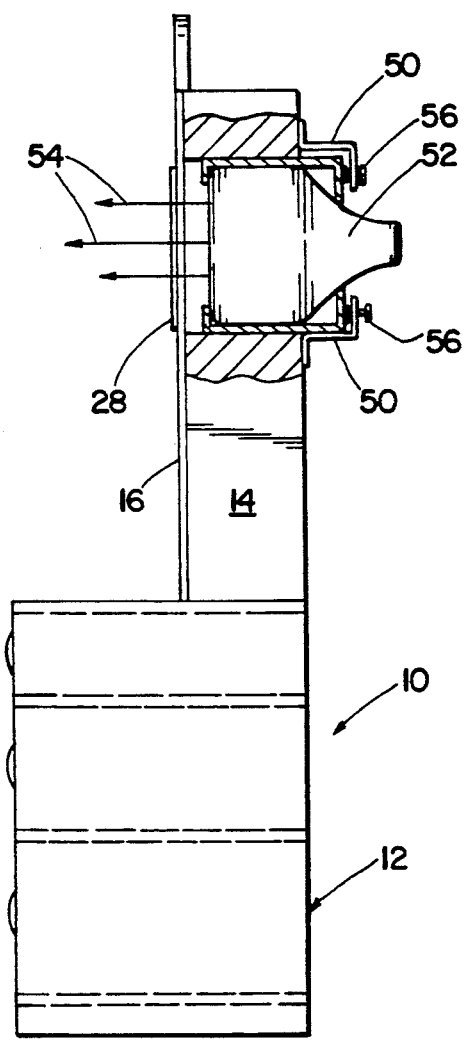
FIG. 4 is a side view of a video according to the present invention.
Figure 4A:
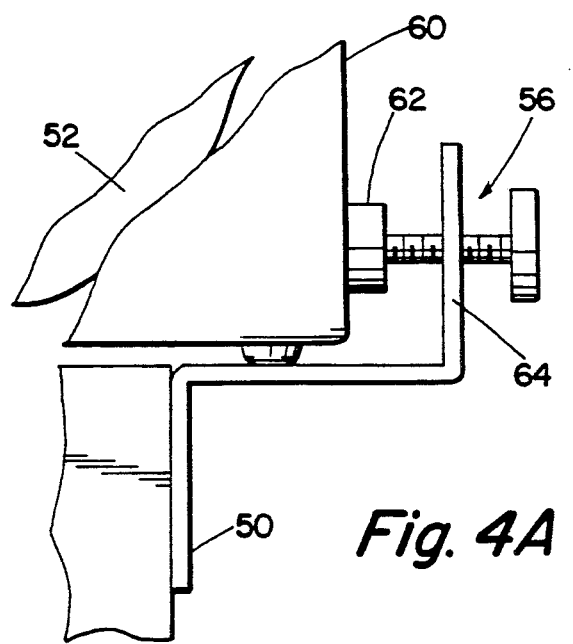
FIG. 4A is a side view of the proposd TV mounting mechanisms according to the present invention.

Shown in further detail in FIG. 4A is the bracket member 50 and the clamp member 56, shown clamping against the back portion 60 of the frame of the video tube 52. A rubber grommet 62 is shown attached to the end of the threaded clamp member 56, so as to not mark the frame 60 of the video tube 52. Clamp member 56 is threadedly engaged with portions 64 of clamp member 50. This is typical of all of the clamps 56 which may hold or abut to the frame member 60 of the video tube 52.

Figure 5:
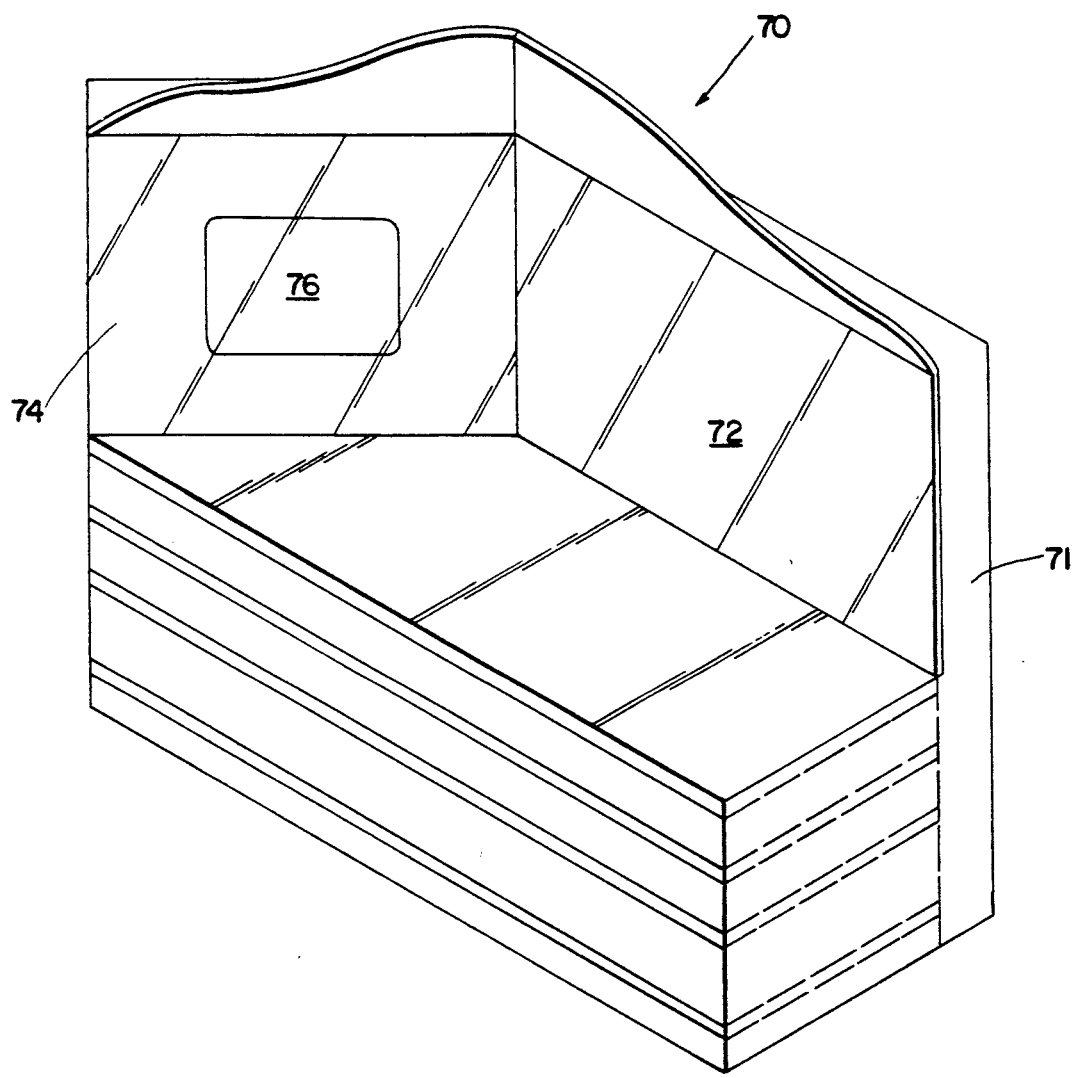
FIG. 5 is a perspective view of a modified video dresser according to the present invention.

Shown in FIG. 5 is, again, a dresser 70, according to the present invention, having an upstanding normal mirror shown at 72 on the frame 71 of dresser 70. In addition, the dresser 70 has a further mirror 74 having a semi-relative, semi-transparent surface 76 formed as part of the mirror 74 and behind which the video transmitter 52 may be located and mounted as is shown in FIG. 4 herein.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A mirror and video image transmitter in combination and comprising:
    a. a dresser comprising a chest of drawers with a frame;
    b. a mirror mounted on said frame and having a back side and a front side;
    c. said mirror comprised of a semi-transparent portion allowing light to be partially transmitted through said mirror from either side of said mirror;
    d. a video image transmitter having means for receiving input video signals and transmitting a video image therefrom;
    e. mounting means connected to said frame for mounting said video image transmitter adjacent to and facing the back side of said semi-transparent portion of said mirror, so that said video images may be transmitted through said mirror from said back side of said mirror; and
    f. means for controlling the amount of light on both sides of said mirror so that when said transmitter is on, the image transmitted may be seen on the semi-transparent portion of the front side of said mirror, and when the transmitter is off, the semi-transparent portion of the front side of said mirror will appear to be a fully reflective mirror.

2. The invention according to claim 1 in which said means for controlling the amount of light on said first and second sides of said mirror comprises a seal interposed between said video image transmitter and said first side of said mirror so that all light emitted from said transmitter is directed through said mirror.

3. The invention according to claim 1 in which semi-transparent portion of said mirror further comprises means thereon for allowing more light to be transmitted from the back side of the mirror through the front side than will be allowed to be transmitted from the front side through the back side of the mirror.

4. The invention according to claim 1 in which said semi-transparent portion of said mirror further comprises means thereon for reflecting more light from the front side of said mirror than is reflected from the back side of said mirror.

5. The invention according to claim 3 in which said semi-transparent portion of said mirror further comprises means thereon for reflecting more light from the front side of said mirror than is reflected from the back side of said mirror.

6. The invention according to claim 4 in which said semi-transparent portion of said mirror further comprises means thereon for allowing more light to be transmitted from the back side of the mirror through the front side than will be allowed to be transmitted from the front side through the back side of the mirror.

7. The invention according to claim 1 in which said mounting means for said video transmitter holds the screen more than thirty (30) inches above the bottom of the dresser.

8. The invention according to claims 5 and 6 in which said mounting means for said video transmitter holds the screen more than thirty (30) inches above the bottom of the dresser.

9. The method of producing a video image transmission from a dresser which comprises the steps of:
    a. providing means for receiving and transmitting video signals from a video transmitter;
    b. providing a portion of the mirror on the dresser with a semi-transparent reflective surface so that light is partially reflected by and partially transmitted through said portion of said mirror;
    c. mounting said transmitter on the back side of the semi-transparent reflective portion of the mirror so that video images may be transmitted through said portion; and
    d. reducing the amount of light on one side of said semi-transparent sheet so that the other side of said semi-transparent sheet appears as a fully reflective mirror when said video transmitter is not transmitting.

10. The method according to claim 9 which further comprises:
    providing a seal between the video transmitter and the semi-transparent reflective portion of the mirror so that the intensity of the video image is maximized when the video transmitter is operating and the lack of light on the video screen side of the mirror is maximized when the video transmitter is not operating.

11. The method according to claim 9 which further includes mounting the transmitter so that the video screen is more than thirty (30) inches above the bottom of the dresser.

12. The method according to claim 9 which further comprises allowing more light to be transmitted from the back side of the mirror through the front side than will be allowed to be transmitted from the front side through the back side of the mirror.

13. The method according to claim 9 which further comprises reflecting more light from the front side of said mirror than is reflected from the back side of said mirror.

14. The method according to claim 12 which further comprises reflecting more light from the front side of said mirror than is reflected from the back side of said mirror.

15. The method according to claim 9 which further comprises allowing more light to be transmitted from the back side of the mirror through the front side than will be allowed to be transmitted from the front side through the back side of the mirror.

* * * * *